(12) United States Patent
Goto

(10) Patent No.: US 7,051,314 B2
(45) Date of Patent: May 23, 2006

(54) METHOD OF COMPUTER-ASSISTED DESIGN OF INTEGRATED CIRCUIT CHIPS, AND LIBRARY OF DELAY TIME VALUES FOR COMPUTER-ASSISTED DESIGN OF SUCH CHIPS

(75) Inventor: Junichi Goto, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 158 days.

(21) Appl. No.: 10/326,379

(22) Filed: Dec. 23, 2002

(65) Prior Publication Data

US 2003/0121014 A1   Jun. 26, 2003

(30) Foreign Application Priority Data

Dec. 25, 2001   (JP) .............................. 2001-392414

(51) Int. Cl.
   *G06F 17/50* (2006.01)

(52) U.S. Cl. .................... 716/19; 716/1; 716/6; 716/21

(58) Field of Classification Search ............... 716/1, 716/6, 14, 19, 21; 438/7, 14, 689; 250/499.22; 714/718; 700/121
See application file for complete search history.

(56) References Cited

U.S. PATENT DOCUMENTS 6,012,833 A * 1/2000 Yoshikawa .................. 700/121
6,526,541 B1 * 2/2003 Sugibayashi .................... 716/1

FOREIGN PATENT DOCUMENTS

JP          11040785 A   *  2/1999
JP         2001-350810      12/2001
JP         2003196341 A  *  7/2003

OTHER PUBLICATIONS

Specific Search Engine, [online], [Retrieved on Dec. 9, 2004], Retrieved from the Specific Search Engine SearchSmallBizIT.com using internet <URL:http://searchsmallbizit.techtarget.com/gDefinition/0,294236,sid44$_{13}$ gci939061,00.html.>.*
Maurine et al., "General representation of CMOS structure transition time for timing library representation", Feb. 14, 2002, Electronics Letters, vol.: 38, Issue: 4, pp.:175-177.*

(Continued)

*Primary Examiner*—A. M. Thompson
*Assistant Examiner*—Helen Rossoshek
(74) *Attorney, Agent, or Firm*—McGinn IP Law Group, PLLC

(57) ABSTRACT

A method of placing integrated circuit chips on a wafer uses a library of average delay time values of logic gates. Exposure-dependent delay time values of the logic gates, which result from exposure of a unit area to a beam of radiation, are additionally stored in the library. These delay time values are detected by successively exposing unit areas of a test wafer to a beam of radiation as a function of relative positions of each integrated circuit chip within the unit exposure area. In a modified embodiment, only one integrated circuit chip within each unit area is exposed to the radiation beam, and the exposure-dependent delay time values are detected as a function of position within the exposed integrated circuit chip or as a function of distance from the center of the each unit area.

13 Claims, 7 Drawing Sheets

OTHER PUBLICATIONS

Greub et al., High-performance standard cell library and modeling technique for differential advanced bipolar current tree logic May 1991, Solid-State Circuits, IEEE Journal of, vol.: 26, Issue: 5, pp.:749-762.*

Kherani et all., "Stochastic models for throughput analysis of randomly arriving elastic flows in the Internet", Jun. 23-27, 2002, Twenty-First Annual Joint Conference of the IEEE Computer and Communications Societies, vol.:2, pp.:1014-1023.*

Kenichi Okada et al, "Layout Dependent Matching Analysis of CMOS Circuits", IEICE Trans. Fundamentals, vol. E82-A, No. 2 Feb. 1999, pp. 348-355.

* cited by examiner

FIG. 3

| INPUT TERM. | | TRANSITION | AVERAGE DELAY (ns) (Tave1) | RANDOM DELAY (ns) (σr1) | CHIP-POSITION-DEPENDENT DELAY (ns) (σw1) | | | | EXPOSURE-DEPENDENT DELAY (ns) (σs1) | | | | 30-1 |
|---|---|---|---|---|---|---|---|---|---|---|---|---|---|
| | | | | | CHIP POSITION WITHIN WAFER | | | | CHIP POSITION IN MULTI-CHIP AREA | | | | |
| | | | | | (0,0) | (0,1) | (0,2) | --- | (0,0) | (0,1) | (0,2) | --- | |
| IN₀ | | H→L | 0.2 | 0.01 | 0.05 | 0.05 | 0.07 | --- | 0.1 | 0.12 | 0.14 | --- | |
| | | L→H | 0.22 | 0.01 | 0.06 | 0.05 | 0.07 | --- | 0.11 | 0.12 | 0.15 | --- | |
| IN₁ | | H→L | 0.24 | 0.01 | 0.06 | 0.06 | 0.06 | --- | 0.12 | 0.12 | 0.16 | --- | |
| | | L→H | 0.26 | 0.01 | 0.07 | 0.07 | 0.09 | --- | 0.12 | 0.12 | 0.17 | --- | |

| INPUT TERM. | TRANSITION | AVERAGE DELAY (ns) (Tave2) | RANDOM DELAY (ns) (σr2) | CHIP-POSITION-DEPENDENT DELAY (ns) (σw2) | | | | EXPOSURE-DEPENDENT DELAY (ns) (σs2) | | | | 30-2 |
|---|---|---|---|---|---|---|---|---|---|---|---|---|
| | | | | CHIP POSITION WITHIN WAFER | | | | CHIP POSITION IN MULTI-CHIP AREA | | | | |
| | | | | (0,0) | (0,1) | (0,2) | --- | (0,0) | (0,1) | (0,2) | --- | |
| IN₀ | H→L | 0.21 | 0.01 | 0.06 | 0.06 | 0.07 | --- | 0.11 | 0.13 | 0.15 | --- | |
| | L→H | 0.2 | 0.01 | 0.05 | 0.05 | 0.05 | --- | 0.11 | 0.12 | 0.15 | --- | |
| IN₁ | H→L | 0.25 | 0.01 | 0.07 | 0.07 | 0.09 | --- | 0.13 | 0.15 | 0.17 | --- | |
| | L→H | 0.24 | 0.01 | 0.07 | 0.06 | 0.08 | --- | 0.12 | 0.14 | 0.17 | --- | |

FIG. 5

LIBRARY 10

DELAY-TIME TABLE

| INPUT TERM. | TRANSI-TION | AVERAGE DELAY (ns) | RANDOM DELAY (ns) | CHIP-POSITION-DEPENDENT DELAY (ns) | | | | EXPOSURE-DEPENDENT DELAY (ns) | | | |
|---|---|---|---|---|---|---|---|---|---|---|---|
| | | | | (0,0) | (0,1) | (0,2) | ----- | GATE POSITION WITHIN CHIP | | | |
| | | | | | | | | S1 | S2 | S3 | ----- |
| IN₀ | H→L | | | | | | | | | | |
| | L→H | | | | | | | | | | |
| IN₁ | H→L | | | | | | | | | | |
| | L→H | | | | | | | | | | |

LIBRARY 10

DELAY-TIME TABLE

| INPUT TERM. | TRANSI- TION | AVERAGE DELAY (ns) | RANDOM DELAY (ns) | CHIP-POSITION- DEPENDENT DELAY (ns) | | | | EXPOSURE-DEPENDENT DELAY (ns) | | | |
|---|---|---|---|---|---|---|---|---|---|---|---|
| | | | | (0,0) | (0,1) | (0,2) | --- | GATE POSITION FROM CENTER OF CHIP | | | |
| | | | | | | | | R1 | R2 | R3 | --- |
| IN0 | H→L | | | | | | --- | | | | --- |
| | L→H | | | | | | --- | | | | --- |
| IN1 | H→L | | | | | | --- | | | | --- |
| | L→H | | | | | | --- | | | | --- |

LIBRARY 10

DELAY-TIME TABLE 60

| INPUT TERM. | TRANSI-TION | AVERAGE DELAY (ns/pF) | RANDOM DELAY (ns/pF) | CHIP-POSITION-DEPENDENT DELAY (ns/pF) | | | | EXPOSURE-DEPENDENT DELAY (ns/pF) | | | |
|---|---|---|---|---|---|---|---|---|---|---|---|
| | | | | \(0,0\) | \(0,1\) | \(0,2\) | ---- | CHIP POSITION IN MULTI-CHIP AREA | | | |
| | | | | | | | | \(0,0\) | \(0,1\) | \(0,2\) | ---- |
| IN₀ | H→L | 1 | 0.05 | 0.25 | 0.25 | 0.35 | ---- | 0.5 | 0.6 | 0.7 | ---- |
| IN₀ | L→H | 1.1 | 0.05 | 0.3 | 0.3 | 0.35 | ---- | 0.55 | 0.6 | 0.75 | ---- |
| IN₁ | H→L | 1.2 | 0.05 | 0.3 | 0.3 | 0.4 | ---- | 0.6 | 0.65 | 0.6 | ---- |
| IN₁ | L→H | 1.3 | 0.05 | 0.35 | 0.35 | 0.45 | ---- | 0.6 | 0.7 | 0.85 | ---- |

METHOD OF COMPUTER-ASSISTED DESIGN OF INTEGRATED CIRCUIT CHIPS, AND LIBRARY OF DELAY TIME VALUES FOR COMPUTER-ASSISTED DESIGN OF SUCH CHIPS

BACKGROUND OF THE INVENTION

1. Field of the Invention

The present invention relates generally to semiconductor integrated circuits and more specifically to a method of placing a plurality of integrated circuit chips on a semiconductor wafer.

2. Description of the Related Art

The computer-assisted design of a semiconductor device (LSI) usually proceeds through a number of stages each involving the use of layout data for the placement of circuit elements on a semiconductor wafer. A layout design of LSI includes a number of processes such as a floor-plan layout process for the determination of location of logic circuit elements, a deployment process for the placement of circuit elements, and a wiring process for the determination of routes for interconnecting the circuit elements. Signals that flow through an interconnection experience a propagation delay. Because of the numerous factors associated with complex fabrication processes, variability exists in propagation delay time between different IC chips. In order to reflect the variability of propagation delay times on LSI design, minimum, normal and maximum delay times of various interconnections are stored in a memory to be used as a library of delay values. However, there is still delay time variability between interconnections within the same semiconductor chip. Delay time variability within a chip includes a position-dependent delay component that varies gradually from one location to another over the surface of the chip. Usually, the position-dependent delay component is caused by a non-uniform thermal distribution or Gaussian noise over the wafer surface during fabrication. The delay time variability also includes a random delay component that occurs randomly over the wafer surface regardless of its surface point. The delay time variability is thus represented by a combined effect of the delay time variations of position-dependent component and those of random component. Details of such delay time variability are discussed in a technical paper titled "Layout Dependent Matching Analysis of CMOS circuits", K. Okada et al, IEIECE Transactions on Fundamentals, Vol. E82-A, No. 2, pages 348 to 355.

Japanese Patent Publication 2001-350810 teaches the use of a library of variances (or standard deviations) of delay time variations to be used for LSI design in order to adapt the interconnection delay time variations of an LSI chip to delay-time variability between different chips. In the disclosed library, the delay time variations of position-dependent component of logical circuits and their delay time variations of random component are stored in addition to average delay times which have hitherto been obtained in known manner.

However, there is still a need to improve the design method of a semiconductor device. Part of the delay time variations of position-dependent component of a wafer is accounted for by delay components generated as a result of the chip-pattern forming process performed by the stepper. In this process, a small region of a semiconductor wafer is exposed to a beam of radiation through a photomask (known as a reticle) and the wafer is moved stepwise to the next region. The process is continued until the same circuit pattern is copied to all regions of the wafer. Since it is likely that all the stepwise pattern forming processes have physical factors in common that affect device performance in terms of delay time, the circuit patterns copied on the wafer tend to share the same physical features. As a result, it is considered that variability of device parameters due to different threshold levels and different turn-on currents account for delay time variations of exposure-dependent component. One of the probable causes of variability is the aberrations of optical lenses of the stepper. Due to the lens aberration, the resolution of a chip pattern on the wafer surface degrades variably depending on the distance from the optical axis of the lens system. Therefore, each of the chip patterns on the wafer exhibits structural variability having a distribution of concentric patterns that differ as a function of distance from the optical axis of the lens system, so that similar structural features can be observed at points spaced at equal distances from the center of the concentric patterns.

FIG. 1 is a graphic representation of delay characteristics of a test chip for evaluation of device parameters on a wafer. The delay characteristics are represented by the flow of current measured as function of distance along the radial direction of the wafer. The solid lines represent distributions of delay times along the radial direction and the broken line represents the delay times of position-dependent component of such delay time distributions. Delay time differences between the radial components and the position-dependent component are delay times of exposure-dependent component. For the purpose of discussion, the delay times of random component are ignored. If the test chip is located only in a particular fixed position of the wafer, the measurement will result in either an overestimated value or an underestimated value. For example, if the test chip is located at one of the points A (where the delay time is minimum), the measured delay times are underestimated values as compared to the delay times of other chips on the same wafer. Conversely, if the test chip is located at one of the points B (where the delay time is maximum), the measured delay times are overestimated values as compared to the delay times of other chips on the same wafer.

However, the prior art integrated circuits were not designed with delay time values of radiation (exposure) dependent component in mind. Thus, need exists to improve the performance of integrated circuits by taking into account exposure-dependent delay time values of logic gates.

SUMMARY OF THE INVENTION

It is therefore an object of the present invention to provide an improved design method of integrated circuit chips on a semiconductor wafer by additionally using delay time values of radiation dependent component.

According to the present invention, there is provided a computer-assisted design method of placing a plurality of integrated circuit chips on a semiconductor wafer by using a library in which average delay time values of logic gates are stored, comprising the steps of storing a plurality of exposure-dependent delay time values of logic gates in the library, the exposure-dependent delay time values representing delay times resulting from exposure of each of a plurality of unit areas of the wafer to a beam of radiation, and calculating a propagation delay time based on the delay time values of the library.

The exposure-dependent delay time values are detected by successively exposing a plurality of unit areas of a test wafer to a beam of radiation. A plurality of integrated circuit chips within each unit area are exposed to the radiation beam and the exposure-dependent delay time values are detected according to relative positions of the exposed integrated circuit chips within the unit area. In a modified embodiment, only one integrated circuit chip within each unit area is exposed to the radiation beam, and the exposure-dependent delay time values are detected as a function of position within the exposed integrated circuit chip or as a function of distance from the center of the each unit area.

According to a second aspect, the present invention provides a method of creating a library of delay time values for computer-assisted design of integrated circuit chips, comprising detecting a plurality of device parameters from a plurality of groups of test chips, wherein the test chips of each of the groups are formed on an identical position of a plurality of test wafers, calculating an average value of the device parameters detected from each of the groups of test chips to produce a plurality of chip-position dependent delay time values for a plurality of logic gates, and calculating a plurality of differences between the device parameters and the average value to produce a plurality of delay time values of random component for the logic gates, successively exposing a plurality of unit areas of a test wafer to a beam of radiation, wherein each unit area contains at least one test chip, detecting a plurality of device parameters from the test chips of the exposed unit areas to produce a plurality of exposure-dependent delay time values for the logic gates, and storing the chip-position dependent delay time values, the delay time values of random component, and the exposure-dependent delay time values in the library.

BRIEF DESCRIPTION OF THE DRAWINGS

The present invention will be described in detail further with reference to the following drawings, in which:

FIG. 3 is an illustration of a typical example of delay time tables created in the library of FIG. 2, in which exposure-dependent delay times are detected by simultaneously exposing multiple integrated circuit chips to a beam of radiation;

FIG. 5 is an illustration of another example of the delay time table in which exposure-dependent delay times are detected by exposing a single integrated circuit chip to a beam of radiation so that the delay time values are uniquely determined as a function of logic gate position within the exposed chip;

FIG. 6 is an illustration of another example of the delay time table in which exposure-dependent delay times are detected by exposing a single integrated circuit chip to a beam of radiation so that the delay time values are uniquely determined as a function of distance from the center of the exposed chip;

FIG. 7 is an illustration of another example of the delay time table in which delay time values of capacitive load component associated with interconnections between logic gates are stored;

DETAILED DESCRIPTION

Figure 1:
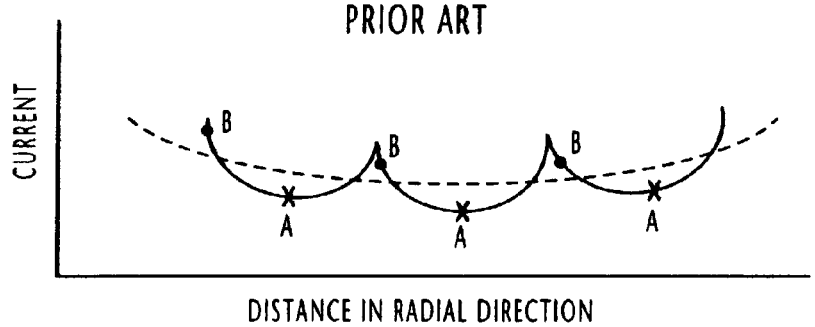
FIG. 1 is a graphic representation of delay-time associated device parameters of a test chip measured according to the prior art design method.
Figure 2:
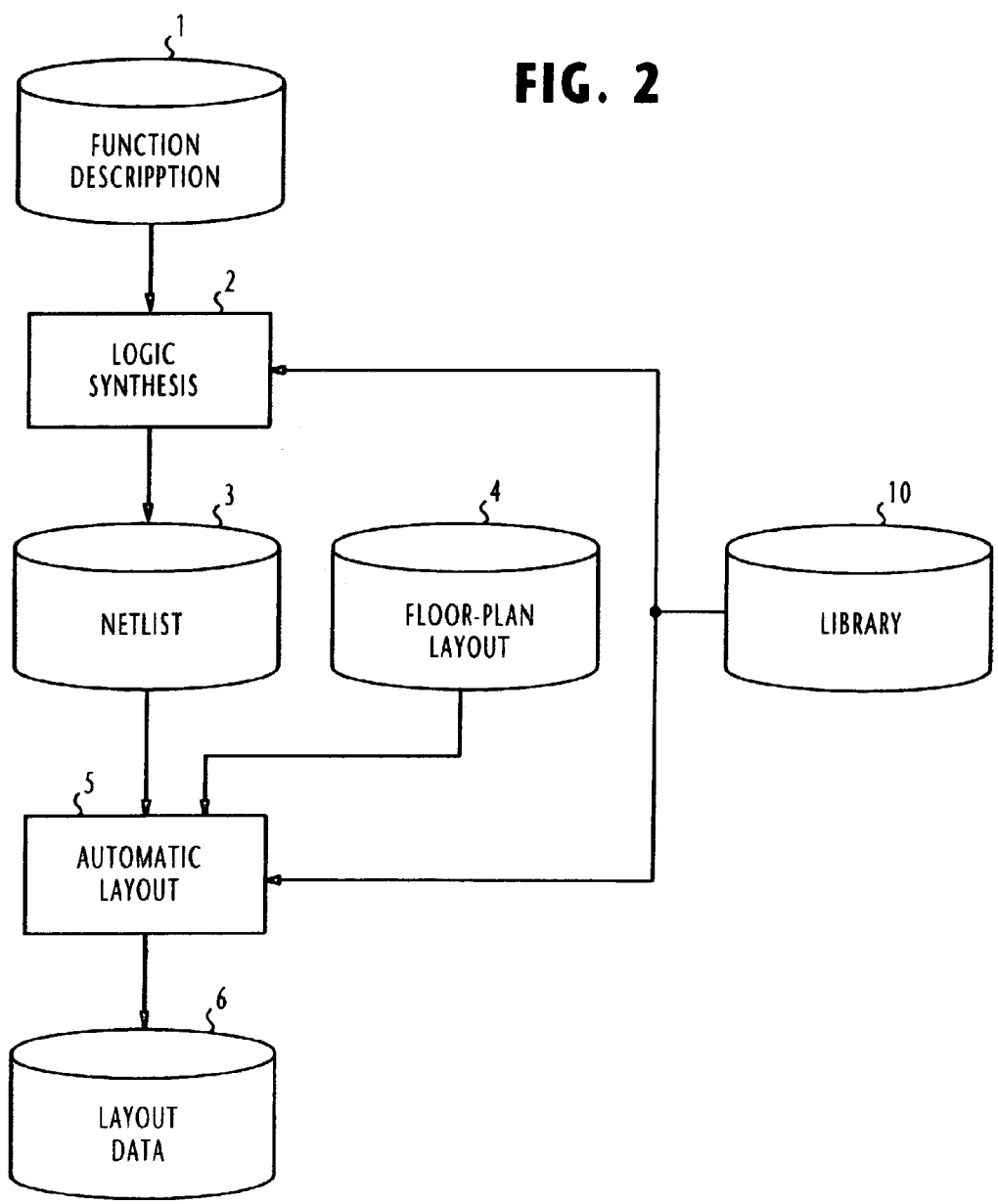
FIG. 2 is a flowchart of the design method of the present invention.

Referring now to FIG. 2, the design method of the present invention proceeds according to the flowchart shown in FIG. 2. The design method of this invention can be broadly divided into two processes. One is a logical synthesis process 2 and the other is an automatic layout process 5. In the logical synthesis process 2, one of its inputs is from a function description 1 which describes the functions of logic gates using a hardware description language such as Verilog-HDL. The other input is from the library 10 whose contents will be described later. Logic synthesis process 2 selects appropriate logic gates stored in the library 10 to realize the functions described in the function description 1. Logic synthesis is optimized by taking the delay times associated with interconnections of the logic gates so that their timing constraints are satisfied. With this optimization, the specified operating speed of an LSI chip can be met. Delay time data used in this optimization process is stored in the library 10. Logic synthesis step 2 results in a netlist 3, which is a file representing interconnections between the logically synthesized logic gates.

One of the inputs to the automatic layout process 5 is supplied from the netlist 3, and the other input is from a floor-plan memory 4 in which a floor-plan layout (coarse placement) of the circuit elements of a semiconductor chip is stored. Based on the input data from the floor-plan memory 4, the automatic layout process 5 produces layout data 6. During this process, the automatic layout process 5 references the delay time data of the library 10, since the logic synthesis process 2 cannot determine the delay times associated with the interconnections.

According to a first embodiment of the present invention, the library 10 is suitable for applications where the beam spot of the pattern-forming radiation (i.e., unit area of exposure) covers a plurality of chip areas.

Figure 4:
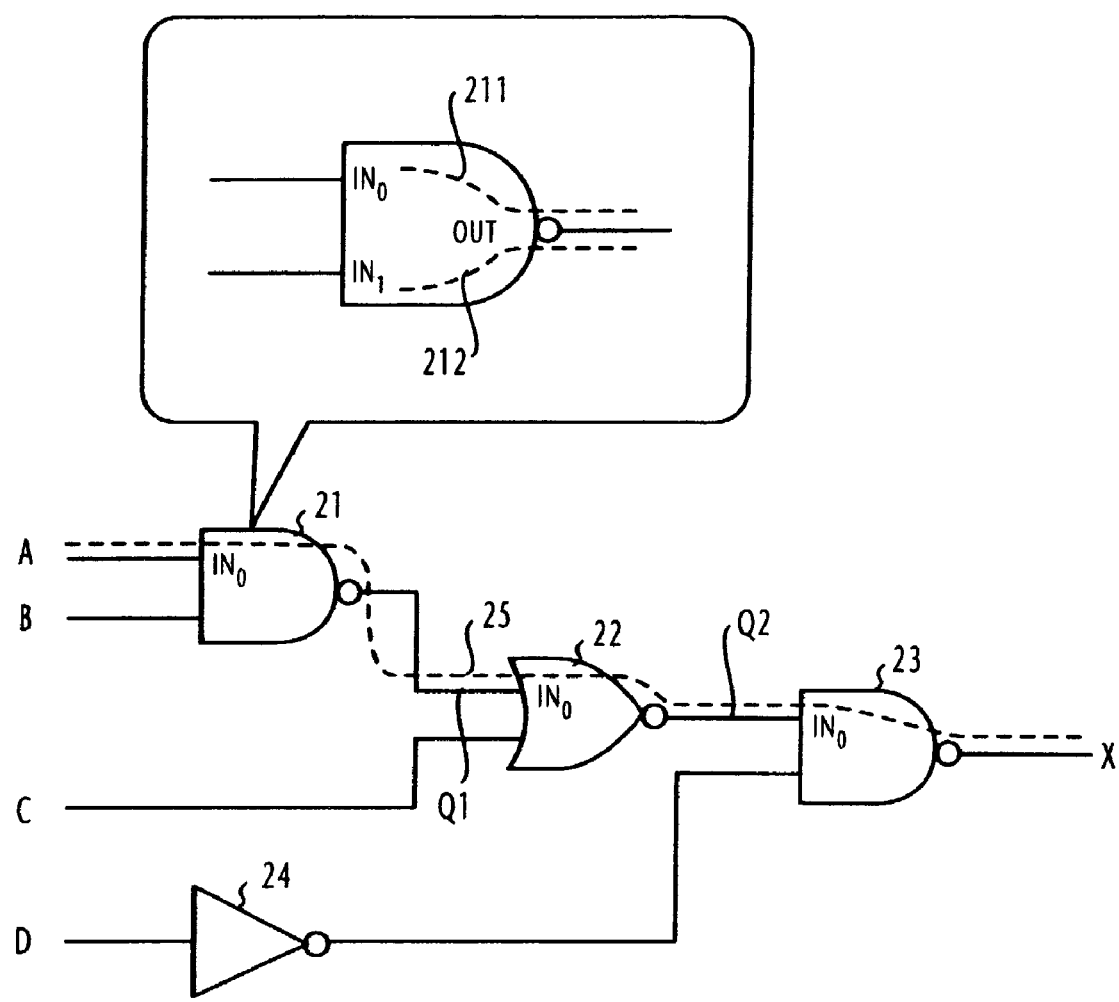
FIG. 4 is an example circuit diagram useful for describing a method of calculating the propagation delay time of a signal path using delay time data of FIG. 3.

FIG. 3 shows details of the library 10 comprises a plurality of delay-time tables 30. A plurality of different types of logic gates 21, 22, 23 of a logic circuit on an LSI chip are shown in FIG. 4. Since there are two types of logic gates along the critical path that has the largest delay time in the logic circuit, only two delay time tables 30-1 and 30-2 are illustrated in FIG. 3.

Each delay-time table 30 is divided into a plurality of rows 11, 12 corresponding to input terminals of the logic gate, and a plurality of columns 13 to 16 corresponding to different delay time components.

Rows 11 and 12 of table 30-1, for example, correspond to input terminals $IN_0$ and $IN_1$, respectively, of the NAND gate 21. Each row is subdivided into upper and lower entries. In the illustrated example, the delay time data of NAND gate 21 when its input $IN^0$ undergoes a HIGH to LOW transition are stored in the columns 13–16 of upper entry and the delay time data of the NAND gate when its input $IN_1$ undergoes a LOW to HIGH transition are stored in the columns 13–16 of the lower entry.

In the column 13 of each delay time table 30, the average delay time values of the corresponding logic gate are stored according to its input terminals and its terminal state transitions. The average value (Tave) stored in the column 13 represents an average delay time value of the population of the delay time values of the logic gate. The standard deviations of delay time values of random component ($\sigma r$), chip-position-dependent component ($\sigma w$) and exposure-dependent component ($\sigma s$) of the logic gate are stored in columns 14, 15 and 16, respectively.

Yield of semiconductor chips tends to vary depending on their relative positions of the surface of a wafer. In the state-of-the art LSI design method, no consideration is taken to reflect in which area of the wafer each IC chip is created. By taking the chip position into the design method, chip yield can be improved.

To this end, the column 15 is subdivided according to coordinate positions, or chip positions (x, y) on the major surface of a wafer to indicate delay-time values of chip-position-dependent component (standard deviations). Column 16 is also subdivided according to the chip positions (x, y) of the wafer surface to indicate delay-time values of multi-chip exposure-dependent component (standard deviations). LSI design method of the present invention takes into account the delay times of each logic gate determined by the physical location of its own IC chip on the surface area of a wafer and by the physical location of its own chip within the multi-chip exposure area of a single radiation beam.

As a typical example, the delay-time table 30-1 of FIG. 3 shows the delay-time table of NAND gate 21 in a logic circuit having input terminals A, B, C, D as shown in FIG. 4. In this logic circuit the NAND gate 21 is connected to the input terminals A, B. The output of NAND gate 21 is connected by a lead Q1 to one input of NOR gate 22, to which the input terminal C is connected. The output of NOR gate 22 is coupled by a lead Q2 to one input of NAND gate 23, to which the input terminal D is connected via an inverter 24.

Consider the NAND gate 21. This logic gate has a first signal path 211 leading from the input terminal $IN_0$ to the output terminal OUT and a second signal path 212 leading from the input terminal $IN_1$ to the same output terminal. The delay time data of the signal paths 211 and 212 are stored in the rows 11 and 12, respectively, of each delay time table 30. The delay time of the logic gate 21 is obtained as follows:

$$Tave1 + \alpha \cdot \sigma w1 + \beta \cdot \sigma s1$$

where, $\alpha$ and $\beta$ are constants determined respectively according to yield. Therefore, the total delay time value of logic gates 21, 22 and 23 are given as:

$$(Tave1+Tave2+Tave3)+\alpha(\sigma w1+\sigma w2+\sigma w3)+\beta(\sigma s1+\sigma s2+\sigma s3)$$

Since the delay time of random component is caused by Gaussian noise during device fabrication, the random component can be considered as an independent event having a normal distribution. Since the statistical properties of normal distribution indicate that the variance of a sum of such normal distributions can be represented by the square root of a sum of squared variances, the total value of random component delay times of logic gates 21, 22 and 23 is given by:

$$(\sigma r1^2 + \sigma r2^2 + \sigma r3^2)^{1/2}$$

Therefore, the delay time of a signal path 25 from the input terminal A to the output terminal X via the $IN_0$ terminals of logic gates 21, 22, 23 is given by:

$$(Tave1 + Tave2 + Tave3) + \alpha(\sigma w1 + \sigma w2 + \sigma w3) + \quad (1)$$
$$\beta(\sigma s1 + \sigma s2 + \sigma s3) + \gamma(\sigma r1^2 + \sigma r2^2 + \sigma r3^2)^{1/2}$$

where, $\gamma$ is an yield-related constant.

The delay time of the signal path 25 is obtained from the delay time tables 30-1 and 30-2 by assuming that the semiconductor chip of the logic gates 21, 22, 23 is located at the coordinate position (0, 0), and that when the binary level at input terminal A changes from HIGH to LOW, the circuit nodes Q1, Q2 and the output terminal X change as follows:

Q1: from LOW to HIGH
Q2: from HIGH to LOW
X: from LOW to HIGH

Under these conditions, the following delay time values are obtained from the tables 30-1 and 30-2 as enclosed by dotted lines.

| | | |
|---|---|---|
| Tave1 = 0.2, | Tave2 = 0.2, | Tave3 = 0.2 |
| σw1 = 0.05, | σw2 = 0.05, | σw3 = 0.05 |
| σs1 = 0.1, | σs2 = 0.11, | σs3 = 0.1 |
| σr1 = 0.01, | σr2 = 0.01, | σr3 = 0.01 |

By substituting these delay time values into Equation (1), a total propagation delay time of 2.032 nanoseconds is obtained for the signal path 25.

According to a second embodiment of this invention, the library 10 is suitable for applications where the beam spot of the pattern-forming radiation covers the area of only one chip. In such applications, a typical delay-time table 40 of the Library 10 is shown in FIG. 5. Column 16A of this table is subdivided according to a plurality of logic-gate positions which are representative of coordinate sample points (S1, S2, ... ) within a single beam spot, spaced at intervals of the order of micrometers. The state-of-the-art floor-planning device can identify the position of each logic gate on the surface of a semiconductor chip. By using such a device, delay time data (or standard deviation) of exposure-dependent component can be determined uniquely for each logic gate by its relative position within its own chip.

If the lens aberration of a pattern-forming system represents a predominant factor of the exposure-dependent component, it uniquely establishes a certain amount of correlation with each coordinate sample position within the unit area of exposure depending on its distance from the center of that area. Thus, as a modified form of the second embodiment of the present invention, the exposure-dependent delay time value of a logic gate of a chip can be modeled as a function of its distance (R) from the center of the chip as indicated in a column 16B of a delay time table 50 of FIG. 6.

Automatic layout process 5 determines the placement of logic gates and interconnections between the logic gates, and hence the wiring capacitances associated with the interconnections. The wiring capacitance of logic gate is a sum of the capacity of a wire connected to its output terminal and the capacities of a number of other circuit elements connected to the wire. With the current technology moving toward narrowing the width of interconnections, their capacitive load is increasingly becoming a dominant factor of the delay time.

FIG. 7 shows another delay-time table 60 for storing delay time data associated with the wiring capacitances of a logic gate, including average delay time values per unit capacitance value (nanoseconds/pF), random delay time values per picofarad (ns/pF), chip-position-dependent delay time values (ns/pF), and exposure-dependent delay time value per picofarad (ns/pF) for different coordinate chip-positions on the wafer. A total value of these capacitance-loaded delay-time values can be obtained in the same manner as described above. The total capacitive-loaded delay-time value of a logic gate is summed with the total delay-time value of the logic gate itself as obtained previously to give a grand total delay time of the logic gate.

The following is a description of a method of detecting the delay-time values of chip-position dependent component, the delay-time values of random component, and the delay-time values of radiation dependent component.

Figure 8:
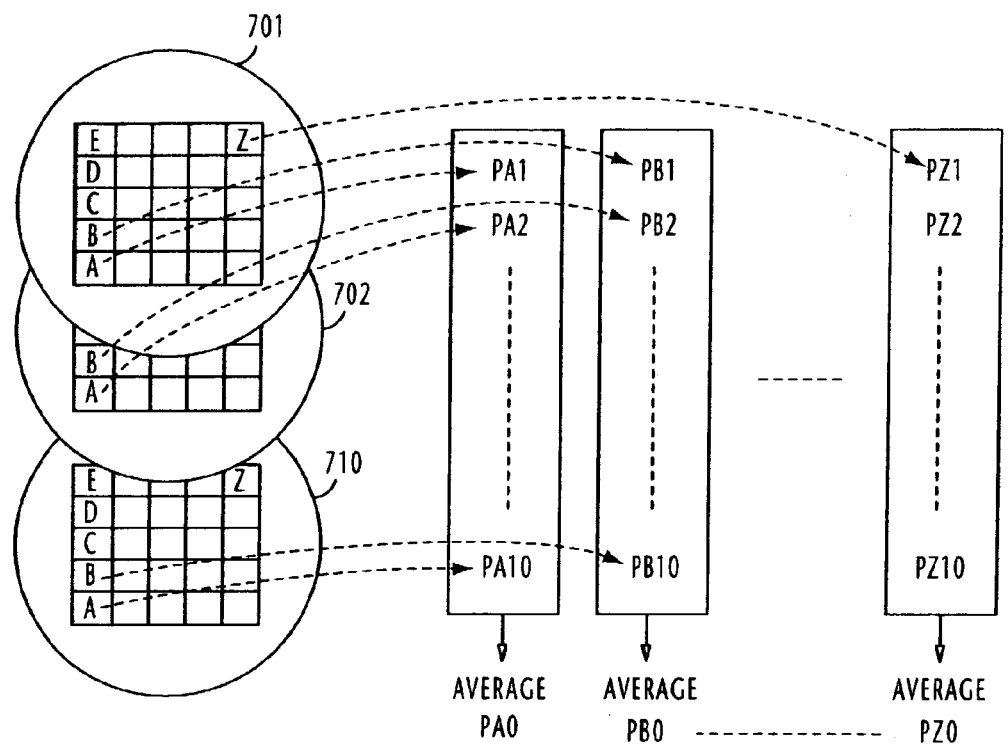
FIG. 8 is a schematic diagram illustrating a process of detecting chip-position dependent delay time values and random delay time values.

In FIG. 8, a plurality of test wafers 701, 702, ..., 710 are illustrated, each containing a plurality of chips arranged in a matrix array for the measurement of device parameters. Device parameters PA1, PA2, ..., PA10 are measured from the chips located at same chip positions A of the wafers 701, 702, ..., 710. Each of these device parameters represents a sum of a delay time of chip-position dependent component and a delay time of random component of the location A of each of these wafers.

An average value PA0 is obtained from device parameters PA1, PA2, ..., PA10. Since the chip-position dependent delay components of a given point of the test wafers have correlations with each other by assuming similar values particular to that point, while the random delay time components have no correlations with each other, the averaging of device parameters of the same point of wafers has the effect of "mutually strengthening" or accentuating the chip-position dependent delay time components, while "mutually weakening" or diminishing the random delay time components.

Therefore, the average value PA0 represents the position-dependent delay time value of a chip position A and the difference value between a device parameter and the average value PA0 represents the random delay time value of a particular test wafer with respect to position A. Therefore, the average value PA0 is subtracted from each of device parameters PA1, PA2, ..., PA10 to obtain differences DA1 (=PA1−PA0), DA2 (=PA2−PA0), ..., DA10 (=PA10−PA0), as random delay components of wafers 701, 702, ..., 710 with respect to their position A. The same process is repeated on points B of all test wafers to produce an average value PB0 which is subtracted from the device parameters PB1~PB10 to produce a random delay time component of a chip position B.

Standard deviations or variances are calculated from the values obtained as just described and stored in the library 10.

Figure 9:
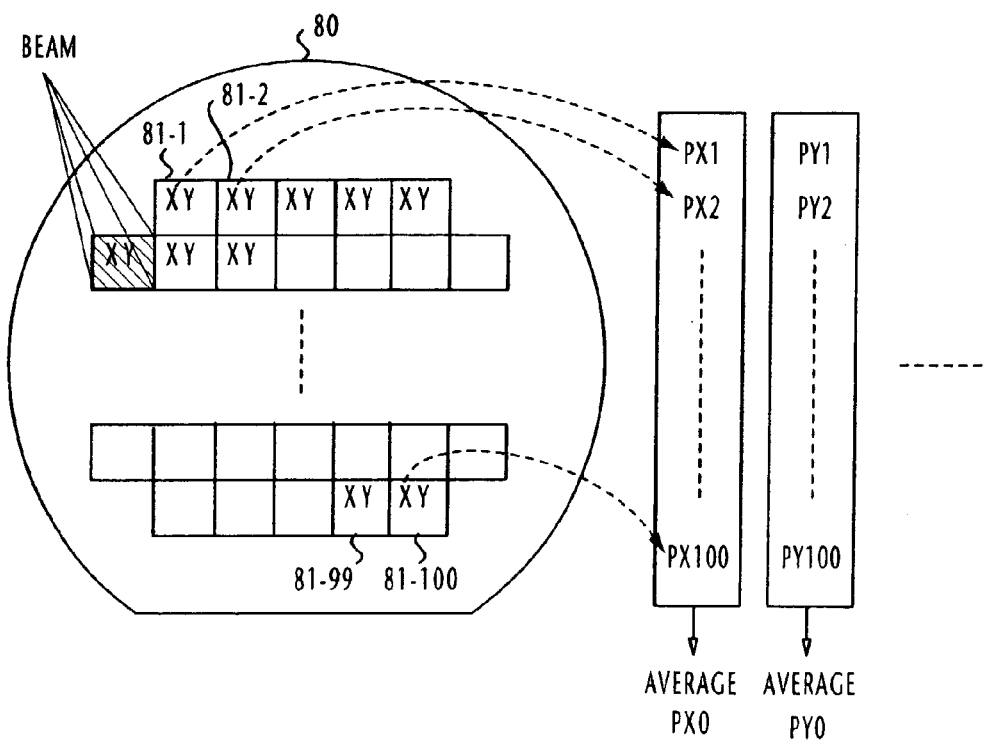
FIG. 9 is a schematic diagram illustrating a process of detecting exposure-dependent delay time values using a beam of radiation that simultaneously illuminates multiple integrated circuits of a unit exposure area.

The delay time values of radiation component are obtained from a plurality of groups of test chips placed on a single wafer 80 as shown in FIG. 9. Each group of test chips is located in one of a matrix array of unit exposure areas 81-1~81-100 and irradiated with a beam of radiation so that the test chips of each group are simultaneously exposed to the same radiation beam. Assume that each group contains two test chips X and Y, for example.

Device parameters PX1, PX2 ..., PX100 are measured from chips X by successively illuminating the areas 81-1, 81-2, ..., 81-100 with the same radiation beam. The average value of the device parameters PX1, PX2, ..., PX100 represents the exposure-dependent delay time values of the unit areas 81-1 to 81-100 with respect to the test chips X which are stored in the library 10. The same process is repeated on the chips Y to produce exposure-dependent delay time values of the unit areas 81-1 to 81-100 with respect to the test chips Y, which are stored in the library.

For determining an average value of delay times, it is desirable that variability between different wafers and production lots are also taken into consideration by classifying delay times into minimum (excellent), typical (standard) and maximum (worst) variability ranges and calculating the average value of the variability ranges.

What is claimed is:

1. A computer-assisted design method of placing a plurality of integrated circuit chips on a semiconductor wafer, said method comprising:

exposing each of a plurality of unit areas on the semiconductor wafer to a beam of radiation to form logic gates thereon;

detecting, from each of the exposed areas, a plurality of exposure-dependent delay time values representing delay times associated with interconnections of the logic gates, the delay times resulting from physical factors of said beam at a plurality of different positions within such exposed area;

storing the detected exposure-dependent delay time values in a library; and calculating a propagation delay time associated with the exposed areas based on the delay time values of logic gates in said library.

2. The computer-assisted design method of claim 1, wherein:

the unit areas are exposed by simultaneously exposing a plurality of integrated circuit chips within each of said unit areas to said beam of radiation, and said exposure-dependent delay time values depend on relative positions of the exposed integrated circuit chips within said unit area.

3. The computer-assisted design method of claim 2, wherein said exposure-dependent delay time values are detected by detecting exposure-dependent delay time values of capacitive load components associated with interconnections between logic gates.

4. The computer-assisted design method of claim 1, wherein:

the unit areas are exposed by exposing only one integrated circuit chip within each of said unit areas, and each of said exposure-dependent delay time values comprises a function of position within the exposed integrated circuit chip.

5. The computer-assisted design method of claim 1, wherein:

the unit areas are exposed by exposing only one integrated circuit chip within each of said unit areas, and each of said exposure-dependent delay time values comprises a function of distance from the center of an associated unit area to the exposed integrated circuit chip.

6. The computer-assisted design method of claim 1, wherein storing the detected exposure-dependent delay time values comprises storing a plurality of chip-position dependent delay time values in said library.

7. The computer-assisted design method of claim 1, wherein storing the detected exposure-dependent delay time values comprises storing a plurality of delay time values of a random component in said library.

8. The computer-assisted design method of claim 1, wherein storing the detected exposure-dependent delay time values comprises adding to said library a plurality of chip-position dependent delay time values and a plurality of delay time values of a random component.

9. The computer-assisted design method of claim 8, wherein storing the detected exposure-dependent delay time values comprises:

detecting a plurality of device parameters from a plurality of groups of test chips, the test chips of each group being located in an identical position on a plurality of semiconductor wafers;

calculating average values of said device parameters respectively detected from said groups of test chips to produce said chip-position dependent delay time values; and calculating a plurality of differences between said device parameters and said average values to produce said delay time values of a random component.

10. The computer-assisted design method of claim 8, further comprising storing in said library delay time values of capacitive load components associated with interconnections between logic gates.

11. A method of creating a library of delay time values for computer-assisted design of integrated circuit chips, said method comprising:

detecting a plurality of device parameters from a plurality of groups of test chips having logic gates thereon, the test chips of each of the groups being formed at an identical position on a plurality of test wafers;

calculating an average value of said device parameters detected from each of said groups of test chips to produce a plurality of chip-position dependent delay time values for a plurality of said logic gates;

calculating a plurality of differences between said device parameters and said average value to produce a plurality of delay time values of a random component for said logic gates;

successively exposing a plurality of unit areas of a test wafer to a beam of radiation, each of said unit areas containing at least one test chip;

detecting, from each of said exposed unit areas, a plurality of exposure-dependent delay time values for said logic gates, representing delay times resulting from physical factors of said beam at a plurality of different positions within such exposed area; and storing said chip-position dependent delay time values, said delay time values of a random component, and said exposure-dependent delay time values in the library.

12. The method of claim 11, further comprising:

detecting a plurality of device parameters from the test chips of said exposed unit areas to produce a plurality of exposure-dependent delay time values of capacitive load components associated with interconnections between said logic gates; and storing the exposure-dependent delay time values of capacitive load components in said library.

13. The method of claim 11, further comprising:

calculating an average value of said exposure-dependent delay time values; and storing the average value in said library.

* * * * *